United States Patent [19]

Settelmayer

[11] Patent Number: 5,730,343
[45] Date of Patent: Mar. 24, 1998

[54] TOWER ASSEMBLY FOR MOUNTING A CROSSBAR TO A VEHICLE ROOF RACK

[76] Inventor: Joseph J. Settelmayer, 3864 D St., Eureka, Calif. 95503

[21] Appl. No.: 587,287

[22] Filed: Jan. 12, 1996

[51] Int. Cl.⁶ ........................................ B60R 9/04
[52] U.S. Cl. ............................. 224/321; 224/331
[58] Field of Search ........................... 224/319, 331, 224/321, 330, 550, 552

[56] References Cited

U.S. PATENT DOCUMENTS

| D. 299,913 | 2/1989 | Arvidsson. | |
|---|---|---|---|
| 2,212,156 | 8/1940 | Erdley. | |
| 2,891,296 | 6/1959 | Darde. | |
| 2,974,985 | 3/1961 | Spreeuwenberg. | |
| 3,528,691 | 9/1970 | Matich. | |
| 3,971,186 | 7/1976 | Havelka et al.. | |
| 4,441,344 | 4/1984 | Kurpershoek. | |
| 4,449,656 | 5/1984 | Wouden. | |
| 4,460,116 | 7/1984 | Bott. | |
| 4,496,089 | 1/1985 | Eklund. | |
| 4,586,638 | 5/1986 | Prescott et al.. | |
| 4,640,450 | 2/1987 | Gallion et al.. | |
| 4,688,706 | 8/1987 | Thulin. | |
| 4,752,022 | 6/1988 | Thulin. | |
| 4,877,169 | 10/1989 | Grim | 224/331 |
| 4,911,348 | 3/1990 | Rasor et al. | 224/321 |
| 4,993,615 | 2/1991 | Arvidsson. | |
| 5,038,988 | 8/1991 | Thulin. | |
| 5,104,020 | 4/1992 | Arvidsson et al.. | |
| 5,275,320 | 1/1994 | Duemmler. | |
| 5,366,195 | 11/1994 | Arvidsson. | |
| 5,383,589 | 1/1995 | Tracy et al.. | |
| 5,397,042 | 3/1995 | Pedrini. | |
| 5,419,479 | 5/1995 | Evels et al. | 224/321 |
| 5,426,827 | 6/1995 | Tracy et al.. | |
| 5,492,258 | 2/1996 | Brunner | 224/321 |
| 5,556,221 | 9/1996 | Brunner | 224/321 X |

FOREIGN PATENT DOCUMENTS

| 376936 | 9/1983 | Austria. |
|---|---|---|
| 36 05 479 A1 | 2/1986 | Germany. |
| 37 09 335 A1 | 3/1987 | Germany. |

OTHER PUBLICATIONS

Instruction sheet for Thule Car Rack Systems, titled: 415 *Load Carriers Instructions*, (no date).
Thule brochure "Racks" date unknown.

*Primary Examiner*—Renee S. Luebke
*Attorney, Agent, or Firm*—Kolisch, Hartwell, Dickinson, McCormack & Heuser

[57] ABSTRACT

A tower assembly for detachably mounting a crossbar to the rail of a vehicle roof-mounted rack. The tower assembly includes a body having a first lever or lifter pivotally mounted to the body about an axis to clamp the crossbar to the body. A second lever is pivotally mounted to the body about the same axis but pivots in the opposite direction to clamp the rail to the body. An actuator is provided for forcing the lifter into engagement with the crossbar and for forcing the second lever into engagement with the rail.

24 Claims, 4 Drawing Sheets

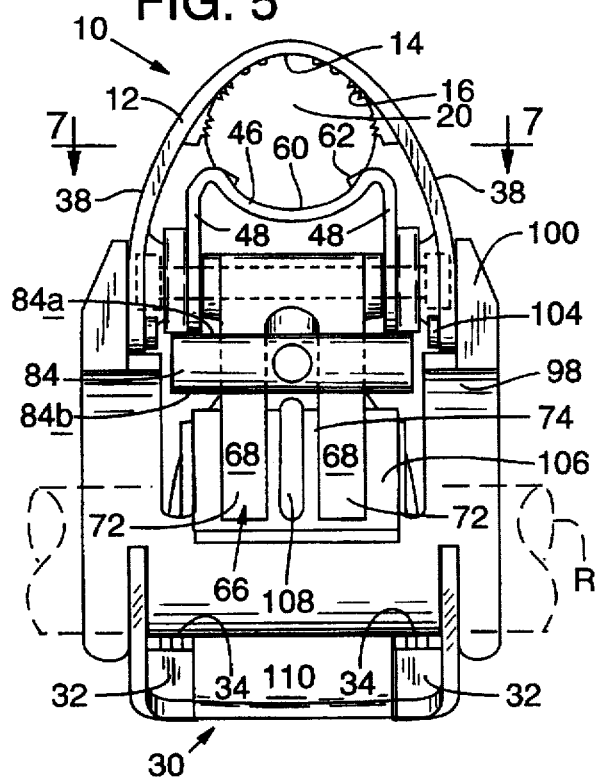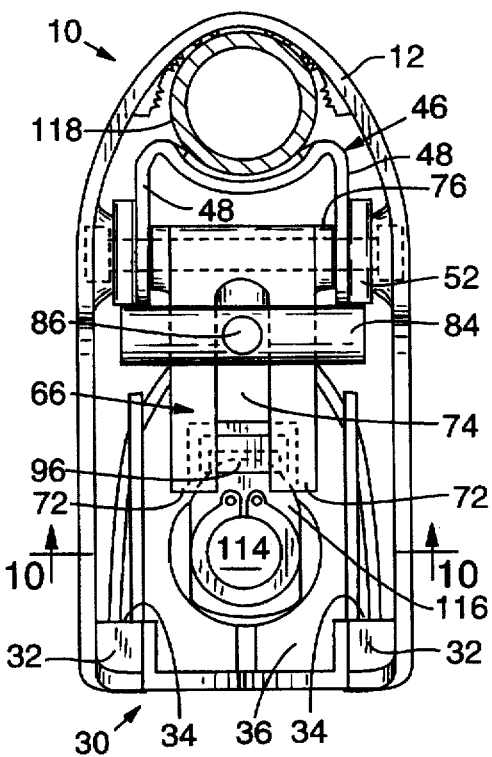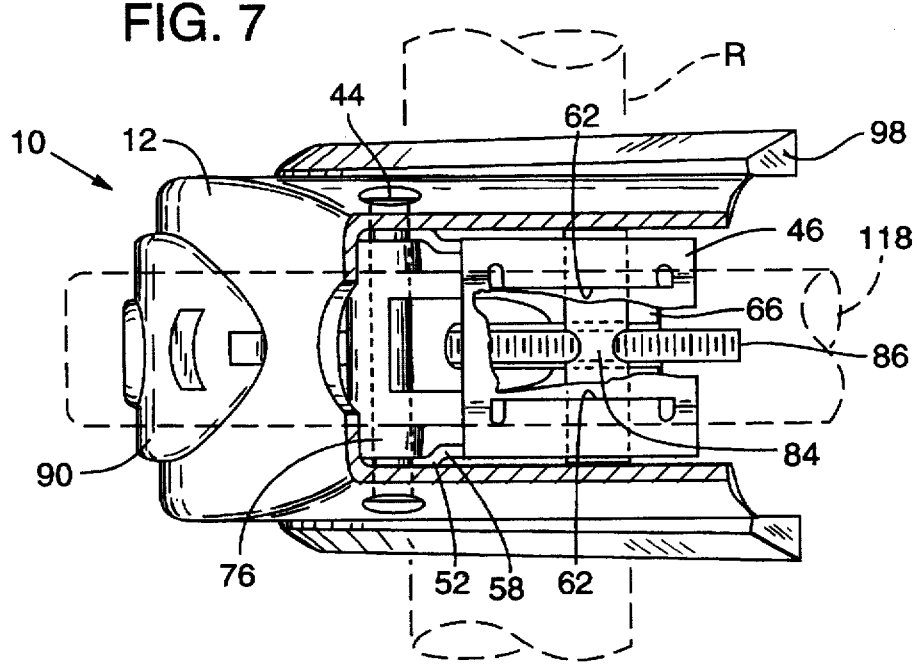

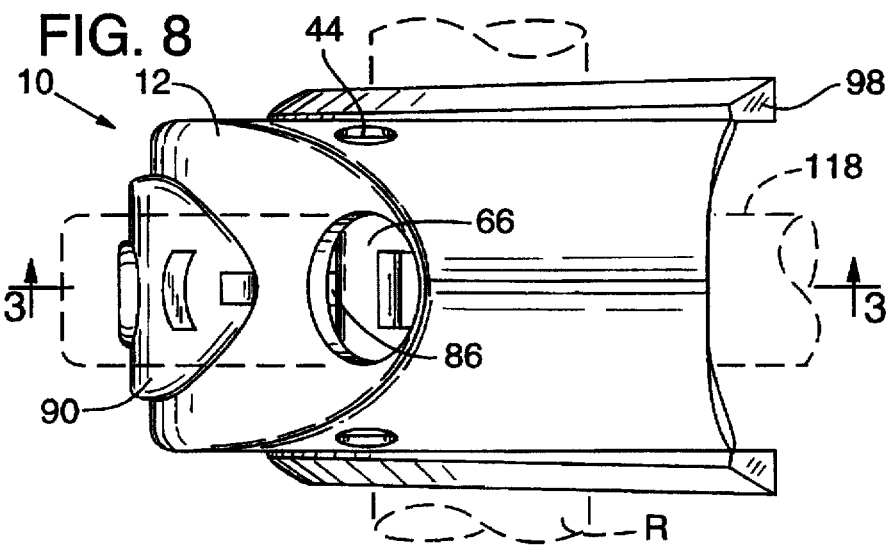
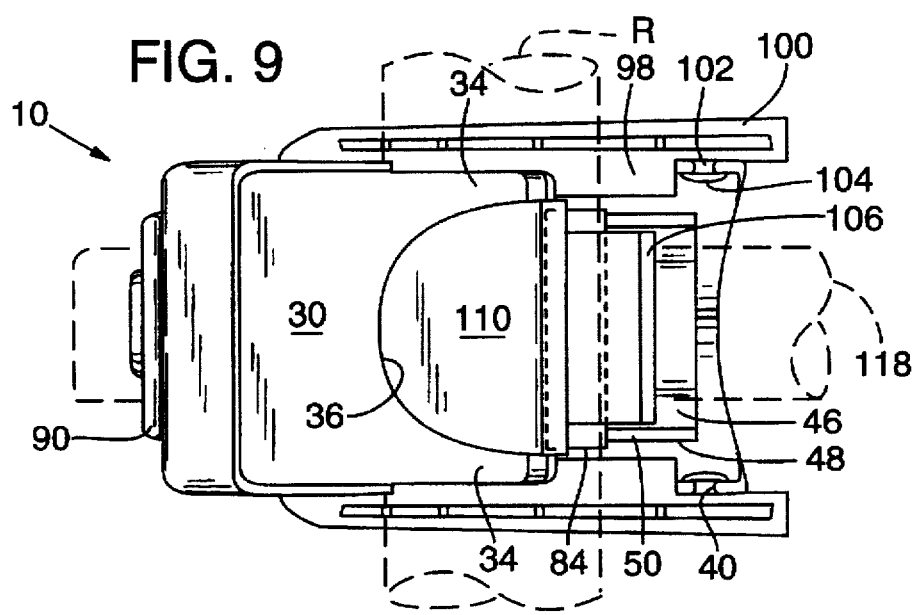
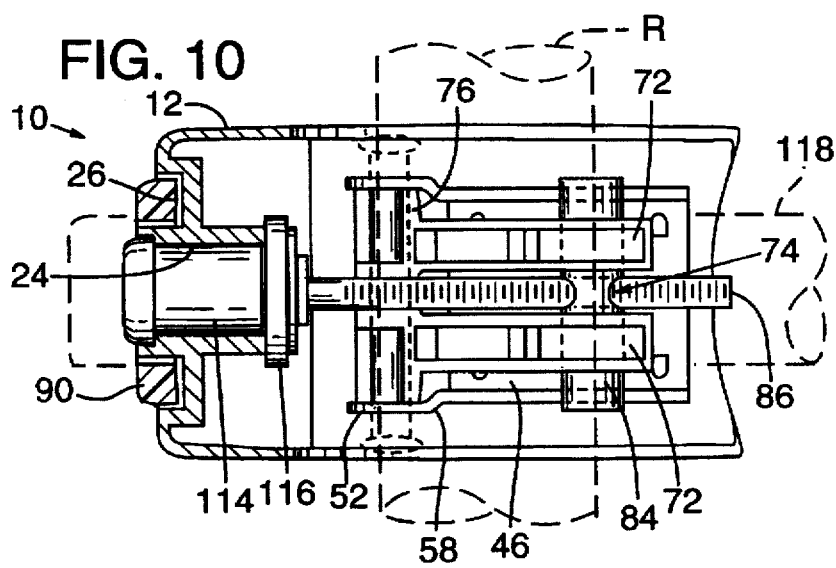

TOWER ASSEMBLY FOR MOUNTING A CROSSBAR TO A VEHICLE ROOF RACK

BACKGROUND AND SUMMARY OF THE INVENTION

The present invention relates generally to vehicle roof racks, and more particularly, to a tower assembly for detachably mounting a crossbar to a vehicle's roof rack. Crossbars are the structural elements of a rack that extend over a portion of the vehicle's roof to provide a mount for articles such as luggage, or for article-carrying accessories such as bicycle carriers, ski carriers and the like.

The primary application for the tower assembly of the present invention is to facilitate installation of crossbars on factory-installed vehicle roof racks. The crossbars on factory racks are often too weak to carry a particular load, or are configured incompatibly with a particular carrier. Factory crossbars may be mounted too close to the vehicle's roof to allow the attachment of a particular carrier, or the securement of a particular load. Thus there is a need for easily-added, structurally sound crossbars. Furthermore, factory crossbars are often difficult to remove and install. The present invention enables a person to conveniently mount a crossbar to a factory rack, with the strength, shape and relative height of the crossbar selected to match the specific load and/or carrier that is to be placed on the vehicle. The invention may be used to mount crossbars directly to a vehicle or to removable racks.

Conventionally, carriers are mounted directly to crossbars, using a semi-permanent connection such as a U-bolt, bolted bracket or fixed sleeve. The connection between the carrier and the crossbar may make it difficult to remove the carrier from the crossbar. Removal and re-installation of a carrier may be required, for example, to improve aesthetics or provide protection to the vehicle, or a carrier may be exchanged for a different activity, such as from skiing to biking. A single carrier may also be used on another vehicle.

Because of the connection between the crossbar and carrier, removal and installation of a carrier usually requires tools and the use of small parts like nuts and lockwashers which are difficult to handle and which can be easily misplaced. If the crossbar cannot be easily removed from the vehicle, then removal of a carrier requires one to reach or work on top of the vehicle. A roof can be hard to reach and difficult to see, and it may be scratched in the process of adding or removing a carrier. For all of these reasons, there is a need for a tower that is easily added and removed from a factory rack.

A principal object of the present invention is to overcome the problems discussed above. The tower assembly of the present invention provides for easy removal and installation of crossbars on a vehicle. In so doing, the tower assembly allows the convenient attachment of carriers to crossbars. The risk of damage to the roof of the vehicle is decreased, and once a carrier is attached to the crossbars, the carrier/crossbar assembly may be readily removed from and then reinstalled on the vehicle using the present invention. For optimum convenience, a carrier/crossbar assembly may be preassembled for each activity or carried load, so that the vehicle can be quickly fitted for each activity.

The tower assembly of the present invention may be mounted on various designs and configurations of factory-installed roof racks. The tower assembly may be selectively positioned on a rail so that the spacing between adjacent tower assemblies can be easily set for various vehicles. The tower assembly enables a single crossbar/carrier assembly to be moved quickly and easily from vehicle to vehicle even if the vehicles and roof racks are different. No tools or parts interchanges are required. The tower assembly is sleek and effective, resulting in a crisp, clean-looking, secure installation on most configurations of vehicle roof racks.

When a crossbar/carrier assembly is to be removed and stored, it is often difficult to store the assembly with a conventional tower, because it projects outwardly from the crossbar, significantly increasing the size of the resulting assembly. The tower assembly of the present invention is easily removed from the crossbar, so that it can be stored separately from the crossbar/carrier assembly, further reducing storage space. The tower assemblies described herein may be interchangeably used with multiple crossbar/carrier assemblies, reducing the cost to the user.

Accordingly, it is an object of the present invention to provide a tower assembly for detachably mounting a crossbar to the rail of a vehicle roof rack. The tower assembly includes a unitary body for securing a crossbar to a rail of a roof rack. The tower assembly houses a clamping mechanism, which in turn includes first and second levers, each connected to the body for pivoting in opposite directions about a common pivot axis. The clamping mechanism further includes an actuator consisting of a handle operable for rotatably displacing a threaded bolt through a slider. When the bolt is rotated, the slider is pulled toward the pivot axis and engages both the first and second levers to pivot so that the first lever clamps the crossbar to the body and the second lever clamps the rail to the body. The actuator is operable to release the clamping action of the levers so that the tower assembly may be detached from the crossbar and rail. A resilient pad partially covers the exposed portions of the claw to prevent marring of the rail or vehicle, increase the frictional grip of the tower on the rail or vehicle, and loosely hold the claw in an open position to make it easier to put the tower on a rail or vehicle.

Additional objects and advantages of the present invention will be more readily understood after a consideration of the drawings and the detailed description of the preferred embodiment.

BRIEF DESCRIPTION OF THE DRAWINGS

FIG. 5 is right side elevation of the preferred embodiment, with the crossbar removed and the factory rail shown in dashed lines to reveal details of the invention;

FIG. 6 is a right side elevation of an embodiment similar to the preferred embodiment, but lacking a pad to cover the claw, shown with a crossbar inserted into the tower assembly;

FIG. 7 is a cross-sectional top view of the embodiment shown in FIG. 5, taken generally along line 7—7 in FIG. 5, with a portion of the clamping assembly being removed to show the details of other portions of the clamping mechanism;

FIG. 8 is a top plan view of the preferred embodiment, shown with the crossbar in dashed lines to reveal details of the invention;

FIG. 9 is a bottom plan view of the preferred embodiment, as shown in FIG. 5; and FIG. 10 is a cross-sectional bottom view of the preferred embodiment, taken generally along line 10—10 in FIG. 6.

DETAILED DESCRIPTION OF THE PREFERRED EMBODIMENT

Figure 1:
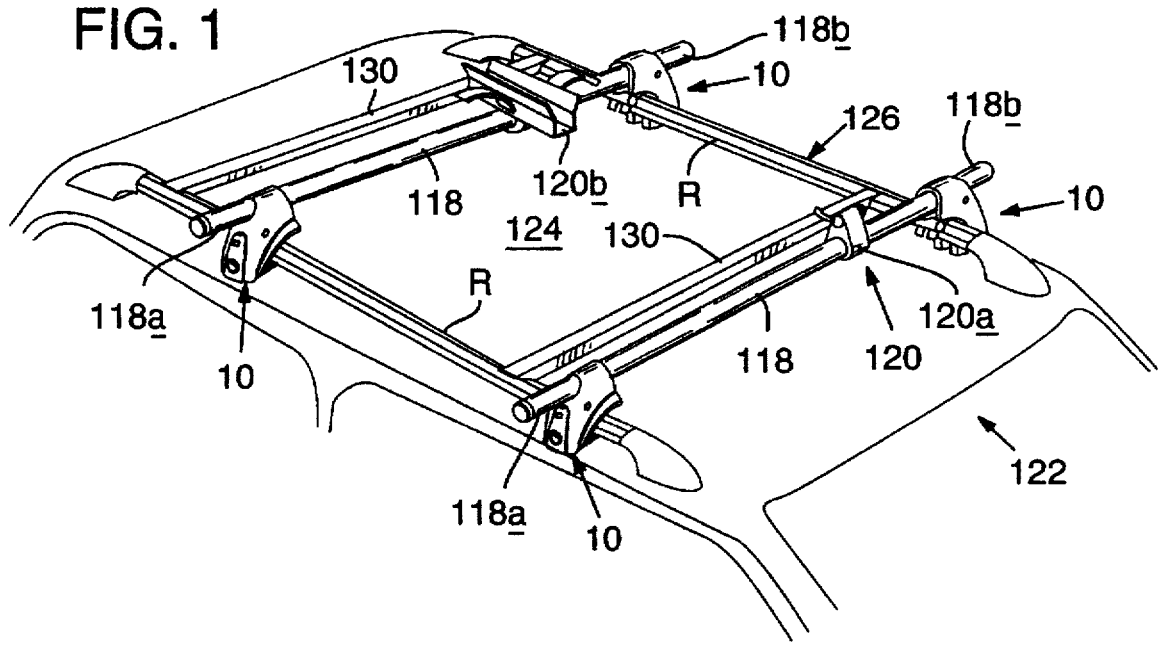
FIG. 1 is an isometric view showing the tower assembly of the preferred embodiment installed in pairs a vehicle roof rack, each pair of tower assemblies holding a crossbar.
Figure 2:
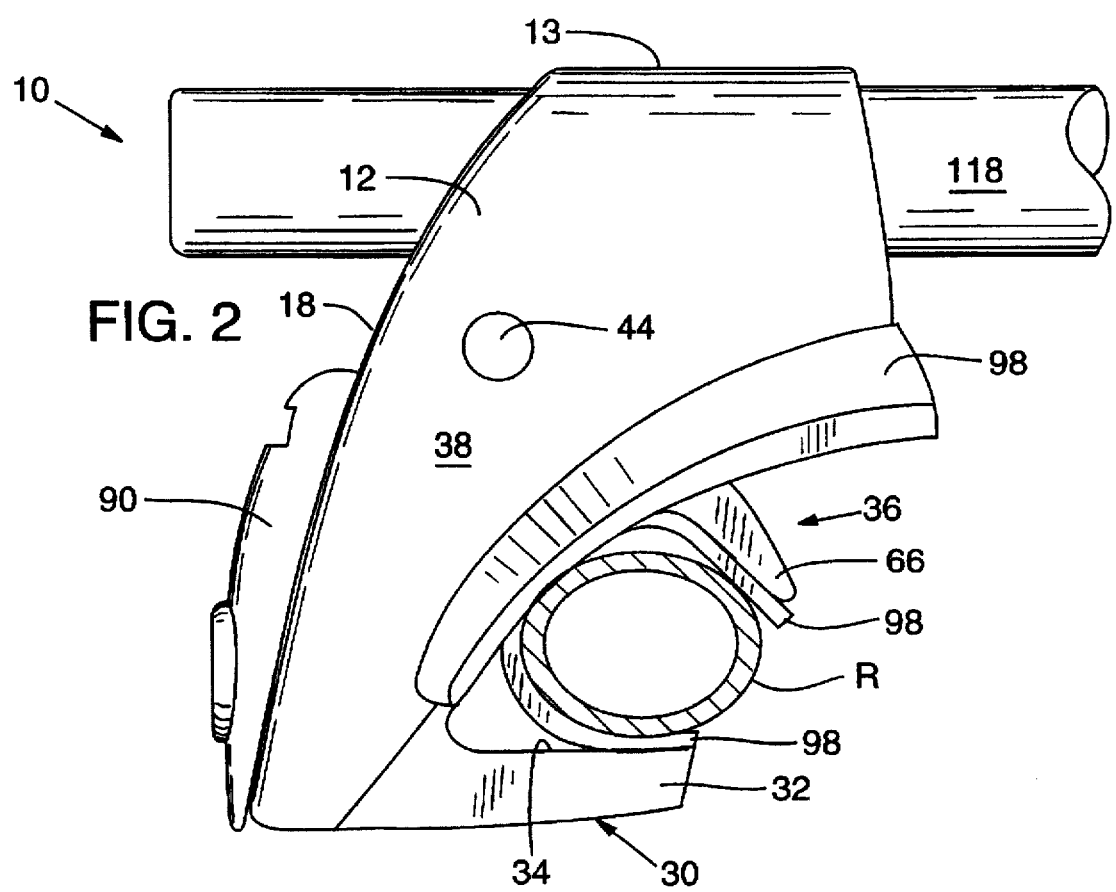
FIG. 2 is a front elevation of the preferred embodiment, shown with a portion of a crossbar and factory rail clamped by the tower assembly.
Figure 3:
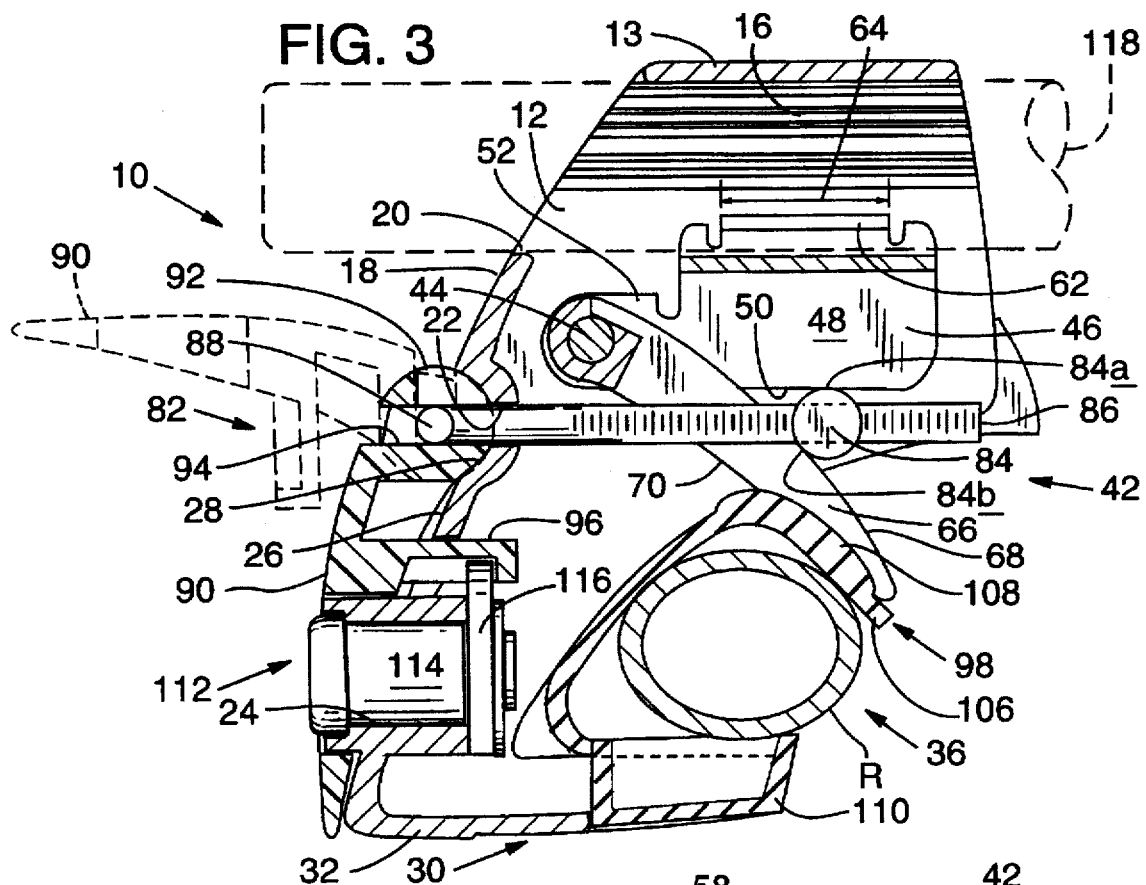
FIG. 3 is a cross-sectional front view of the preferred embodiment, taken generally along line 3—3 in FIG. 8, with dashed lines showing the handle in its operating position.
Figure 4:
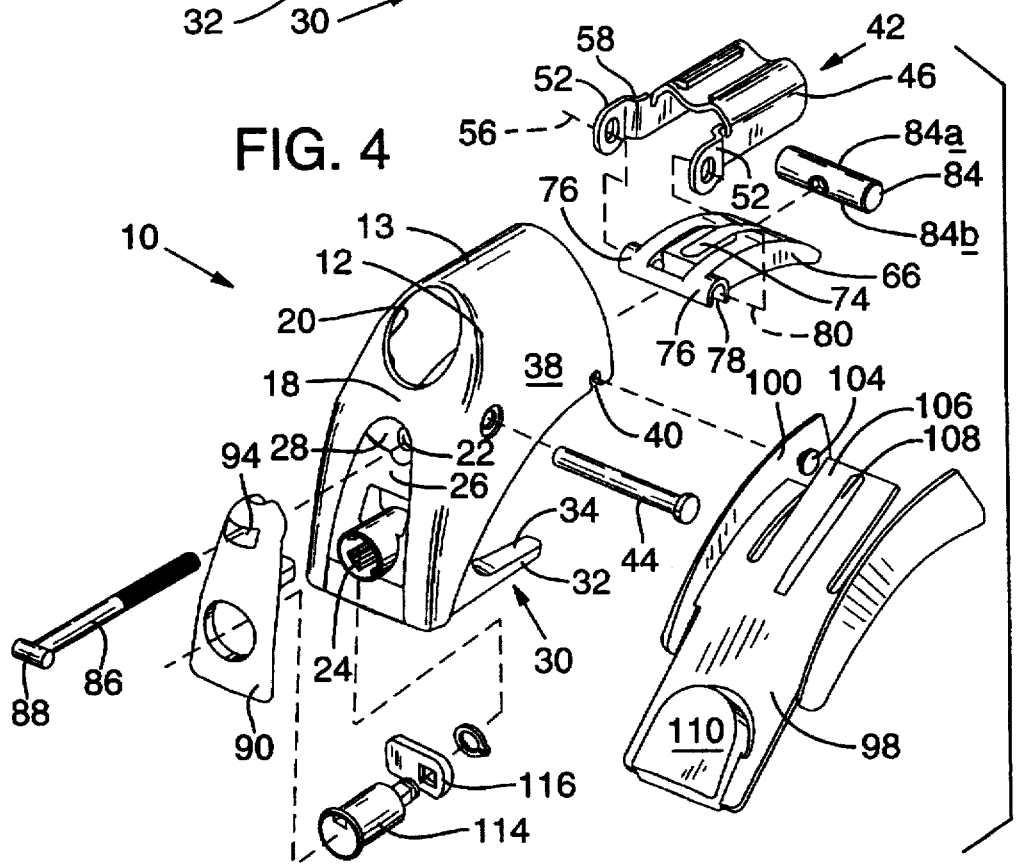
FIG. 4 is an exploded, isometric view of the preferred embodiment, with dashed lines indicating the approximate assembly of the components.

The tower assembly of the present invention, generally indicated at 10, is shown in FIG. 1 mounted on the rails R of a roof-mounted vehicle rack to support a pair of crossbars. Two pairs of the detachable tower assemblies are required, each pair supporting an associated crossbar. As shown in FIGS. 2 and 3 and the exploded view of FIG. 4, tower assembly 10 includes a unitary body 12 formed with a top 13 defining a dome-like enclosure with an interior wall 14 (see FIGS. 5 and 6) for receiving a crossbar, and a base or bottom indicated at 30. Parallel rows of linear teeth 16, shown in FIGS. 3 and 5, are formed on interior wall 14 shaped as protruding ridges for engaging a crossbar and preventing it from rotating. As shown in FIGS. 3 and 4, body 12 includes an inclined rear wall 18 provided with an oblong aperture 20, a bolt aperture 22 and a lock aperture 24. An indented, semispherical receptacle 28 and a further recess 26 are formed in rear wall 18 for receiving an actuator handle, in a manner to be described. The bottom of body 12, shown at 30, is defined by a pair of spaced-apart legs 32 each having an upper surface 34. As can be seen, body 12 is formed as a unit, defined by top 13, rear wall 18, bottom 30 and sides 38. The unit is generally C-shaped when viewed in profile, providing an opening 36 for receiving a rail of a roof-mounted rack. As shown in FIG. 4, sides 38 include a key hole-shaped slot 40 for receiving a pad 98.

A clamping mechanism, generally indicated at 42 in FIGS. 3 and 4, is housed in body 12 and includes a first lever or lifter 46, a second lever 66, a cylindrical slider 84, a bolt 86 and a handle 90. Lifter 46 and lever 66 are both pivotally mounted to body 12 at a common pivot axis defined by a pivot pin 44. As shown in FIGS. 5 and 6, lifter 46 is formed with a pair of parallel, spaced-apart sidewalls 48 each having a bottom edge 50 which slidably engages slider 84. Sidewalls 48 extend to form ears 52, each having an aperture 54 for receiving pin 44. Apertures 54 define a pivot axis 56 about which lifter 46 may pivot on pin 44. As shown in FIG. 7, a bend 58 is formed in each sidewall 48 to orient the sidewalls so that they will not contact the interior surface of sides 38 of body 12. Lifter 46 is configured with an upper dished or saddle-shaped surface 60 as shown in FIGS. 5 and 6 for cradling a crossbar. Upper surface 60 forms a lifting surface, for engaging a crossbar, in a manner to be described, and preferably has one or more protruding linear teeth 62 having a length indicated at 64 as shown in FIG. 3.

As shown in FIG. 3 and 4, lever 66 is tapered and is formed with an upper arcuate surface 68 and a lower arcuate surface 70. As shown in FIGS. 5 and 6, lever 66 is formed with a pair of spaced-apart prongs 72 that define a deft or void 74. Lever 66 is formed with spacers 76 (see FIG. 7 also) to provide clearance between lever 66 and sidewalls 48 of lifter 46. An aperture 78 is formed in spacer 76 of lever 66 to define a pivot axis which corresponds to pivot axis 56 when lifter 46 and lever 66 are mounted in body 12 by pin 44.

An actuator, generally indicated at 82 (see FIG. 3), is mounted in body 12 and is selectively operable for simultaneously pivoting lifter 46 and lever 66 to clamp a crossbar and a rail, respectively. Actuator 82 includes a slider 84 which may be a cylindrical barrel nut as shown. Slider 84 includes a first portion 84a for slidably engaging lifter 46 against bottom edges 50 and a second portion 84b for slidably engaging arcuate surfaces 68 of lever 66. Slider 84 is moved inwardly or outwardly, relative to body 12, by a tensioner in the form of a threaded bolt 86, preferably T-shaped and cylindrical, having a head 88. As shown in FIGS. 3 and 4, a handle 90 engages head 88 and is manually operable for rotating bolt 86 about its longitudinal axis thereby to push or pull slider 84. A first locking position of handle 90 is shown in cross-section in FIG. 3, and a second operating position is shown in dashed lines. Handle 90 is preferably retained on bolt 86 by T-shaped head 88, as shown best in FIGS. 3 and 4.

Handle 90 includes a semispherical bearing end 92 which mates with semispherical receptacle 28. The semispherical shapes of end 92 and receptacle 28 enable handle 90 to be pivoted, as shown in dashed lines in FIG. 3, and to be rotated as required to threadably extend or retract bolt 86 in slider 84. A bolt-receiving receptacle is indicated at 94, into which bolt 86 extends, and by which head 88 is retained relative to handle 90. A latch-receiving tab is indicated at 96.

As shown in FIGS. 3 and 4, an optional accessory for tower assembly 10 includes detachable pad 98, preferably a nonmarring, resilient rubber piece shaped as shown in FIG. 4. Pad 98 includes upwardly-extending sidewalls 100, each of which includes a cylindrical retaining post 102 having an enlarged head 104. Post 102 is insertable into slot 40 to thereby anchor pad 98 to body 12. Pad 98 further includes a tongue 106 (see FIG. 3) located to underlie lever 66, including an alignment ridge 108 insertable into cleft 74 of lever 66, thereby maintaining tongue 106 in alignment with the lever. A void-filling heel is formed in pad 98, as indicated at 110, which mates with opening 36 of bottom 30 to further retain pad 98 on body 12.

Another optional accessory is a lock 112, shown in FIGS. 3 and 4, which includes a keyed core 114 and a latch 116 that engages tab 96 of handle 90, thereby locking the handle relative to body 12.

A pair of tower assemblies 10 operate to clamp a crossbar, such as crossbar 118 shown in FIG. 1, by clamping end portions 118a and 118b to each tower assembly body, and in turn to opposed rails R. Two crossbars 118 are shown in FIG. 1, with a carrier 120 mounted on one, in the form of a fork-mount bike carrier 120a and a wheel tray 120b. Crossbars 118 are shown attached to a vehicle 122, with a roof indicated at 124 and a factory installed roof rack indicated at 126. Factory side rails are shown at R, on opposite sides of the roof, and factory crossbars at 130.

Clamping mechanism 42 of the present invention creates outwardly directed clamping forces by means of a reverse-acting "scissors" action of lifter 46 and lever 66 to clamp a crossbar and a rail simultaneously against the top of body 12 and its bottom 30, respectively. As shown in FIGS. 3 and 4, barrel nut 84 is slidably inserted between lifter 46 and lever 66, and is retained in that position by bolt 86. Barrel nut 84 is pulled toward pin 44 by threading bolt 86 into the barrel nut, and its surfaces 84a and 84b engage edges 50 and surfaces 68, respectively. This action pivots lifter 46 counterclockwise (as seen in FIG. 3) about pin 44 to clamp a crossbar inserted in body 12, such as crossbar 118, and at the same time pivots lever 66 in the opposite direction, clockwise, to clamp factory side rail R. Outwardly-directed clamping forces are opposed by the top interior wall 14 of body 12 encompassing crossbar 118, and by legs 32 at bottom 30. The bottom, of course, has been inserted underneath factory side rail R. The tower assembly is thus securely fastened to both crossbar 118 and factory side rail R by one simple action of operating handle 90 to rotate bolt 86.

Lever 66 is both arcuate and tapered, and looks somewhat like the claw of a hammer. The cooperation between barrel nut 84, lever 66 and legs 32 enables factory side rails R of various cross-sections and sizes to be gripped with a single configuration and size of tower assembly. Use of tower assembly 10 of the present invention avoids the need to select a tower specifically designed for a specific vehicle, enabling one to interchangeably use the tower assembly on different vehicles and different roof racks. Nonmarring rubber pad 98 is attached to the tower assembly so that lever 66 and surfaces 34 of legs 32 are covered, thereby protecting factory side rail R from damage during installation and use of the tower assembly.

In the preferred embodiment, lifter 46 has a dished or saddle-shaped upper surface 60 to engage or conform to a cylindrical crossbar 118, and includes linear teeth 62 punched to protrude slightly above that upper surface. Teeth 62 prevent a crossbar from rotation relative to the tower assembly, thus ensuring that carriers such as a fork mount 120 (shown in FIG. 1) or wheel tray 120b are maintained properly oriented for use. Upper surface 60 and the length 64 of protruding teeth 62 minimize the amount of marring through the surface of a crossbar, in addition. Alternatively, lifter 46 may be contoured to conform to other shapes of crossbars, such as those with square, rectangular or other cross-sections.

Installation of tower assembly as above described may proceed as follows. Initially, as shown in FIG. 1, a first tower assembly, such as the one next to the front passenger's side is placed on a factory side rail R so that its legs 32 slip under rail R. Actuator 82 is operated by turning handle 90 as if it were a screwdriver, so that lever 66 is pivoted downwardly to engage rail R and clamp it against legs 32 of body 12. A crossbar, such as at 118, is then fed into the opening at the top of body 12, between the upper surface of lifter 46 and interior wall 14. Next, a second tower assembly is mounted on the opposite side, adjacent the driver's side, with its legs slipped beneath the opposite factory side rail R.

Crossbar 118 is then slid into the second tower assembly, until end 118a and opposite end 118b extend outwardly from each tower assembly the desired distance. This automatically adjusts the spacing between the tower assemblies to fit a particular factory rack on which the crossbar is being mounted. Actuator 82 on each tower assembly is then further actuated to selectively pivot lifter 46 and lever 66 in opposite directions so that lifter 46 securely grips crossbar 118 and lever 66 securely clamps rail R against body 12. This is done by rotating handle 90 to thread bolt 86 into barrel nut 84, thereby pulling the barrel nut against lifter 46 and lever 66. It should be appreciated that the tower assemblies are interchangeable, meaning that they can be used as shown in FIG. 1, with each rear wall 18 oriented to face outwardly, by simply turning each tower assembly appropriately. Alternatively, rear wall 18 of one or more of the tower assemblies could be oriented to face toward the inside of the rack, if desired.

The tower assembly of the present invention provides several distinct and important advantages. First, the unitary construction of body 12, and the generally C-shaped profile with opening 36 permit tower assembly 10 to be easily mounted on a rail, such as a factory-installed rail shown in FIG. 1. Initially, actuator handle 90 is operated so that second lever 66 is opened to permit sufficient room for a rail to be inserted below the lever and above bottom 30. With the tower assembly so positioned, a crossbar may be fed in from the right (viewing FIG. 3) so that it extends through aperture 20 on top 13 of body 12 as shown. A second tower assembly is then mounted on the opposite rail, and the crossbar is then fed through the top of that tower assembly's body. Depending on the desired ultimate positioning of the tower assemblies, and the relative position of a crossbar, the tower assemblies may be longitudinally shifted along the rails and the crossbar may be laterally shifted to a desired position. Once that is accomplished, the actuator handles of the respective tower assemblies are manipulated to draw or pull slider 84 to effect the clamping action of lifter 46 against the crossbar and second lever 66 against the rail. Additional tower assemblies and crossbars may be mounted as desired.

The tower assembly of the present invention is a compact, integral unit, and the mounting of pivot pin 44, to provide a common pivot axis for lifter 46 and second lever 66, facilitates the compactness of the unit. By mounting pivot pin 44 as shown, a region, such as indicated at 36 in FIG. 3 is provided enabling a rail to be quickly positioned beneath second lever 66 and above bottom 30. Tower assembly 10 of the present invention is dimensioned so that it may be readily handled. Moreover, handle 90 enables one to quickly adjust the clamping forces on a crossbar and rail, thereby enabling quick mounting or detachment of the tower assembly.

Provision of a common pivot axis for lifter 46 and second lever 66 enables the lifter and second lever to pivot in opposite directions thereby providing simultaneous clamping of a crossbar and a rail to body 12. A person needs to make only a single adjustment to effect complete clamping. And, by providing the arcuate surface such as indicated at 68 on second lever 66, slider 84 may travel smoothly therealong, during clamping action, while still exerting a force upwardly against edges 50 of lifter 46. Still further, by providing the C-shaped profile, as described above, and the region indicated at 36, sufficient room is provided to position a protective pad such as indicated 98.

With the unitary construction as described, and the recesses described with respect to inclined rear wall 18, handle 90 is mounted so that when it is in its nonoperative position, the profile of the back wall and the handle visually blend, again providing a relatively compact configuration. The unitary body houses the components for the clamping action and provides an upper region for receiving a crossbar and a lower region for a rail.

While the present invention has been shown and described with reference to the foregoing preferred embodiments, it is to be understood by those skilled in the art that other changes in form and detail may be made without departing from the spirit and scope of the invention as defined in the appended claims.

I claim:

1. A tower assembly for detachably mounting a crossbar to a rail of a vehicle-mounted roof rack comprising:

a tower body for receiving a portion of the crossbar;

a clamping mechanism housed in the body including first and second levers pivotally mounted to the body; and an actuator operable for selectively pivoting the first and second levers so that the first lever clamps the crossbar against the body and the second lever clamps the rail against the body.

2. A tower assembly for the installation of a crossbar on a vehicle comprising:

a tower body having a top for receiving a portion of the crossbar;

a first lever pivotally mounted to the body about a pivot axis so that the first lever can be rotated to clamp the crossbar between the first lever and the top of the body; and a first actuator for forcing the first lever against the crossbar, wherein the first actuator is a slider that slides along the first lever to force the first lever toward the top of the body as the slider slides toward the pivot axis of the first lever.

3. The tower assembly according to claim 2, wherein the slider includes a barrel nut threaded onto a bolt, and turning the bolt threads the bolt into the barrel nut, thereby forcing the barrel nut toward the pivot axis of the first lever.

4. The tower assembly according to claim 2, wherein:

the crossbar is about cylindrical; and the first lever is dished to conform to the cylindrical crossbar.

5. The tower assembly according to claim 2, wherein the body has a bottom for receiving a portion of the vehicle, further comprising:

a second lever pivotally mounted to the body about a pivot axis so that the second lever can be rotated to clamp the portion of the vehicle between the second lever and the bottom of the body; and a second actuator for forcing the second lever against the portion of the vehicle.

6. The tower assembly according to claim 2, further comprising:

a threaded bolt operatively connected to the slider so that turning the bolt forces the slider toward the pivot axis of the first lever; and a handle retained on the bolt for manually turning the bolt.

7. The tower assembly according to claim 6, wherein:

the handle has a semispherical end that bears against the body; and the body has a semispherical receptacle conforming to the semispherical end of the handle.

8. The tower assembly according to claim 2, wherein the first lever includes linear teeth that protrude outwardly from the first lever to engage the crossbar, thereby substantially fixing the crossbar relative to the tower assembly when the first lever is actuated to clamp the crossbar.

9. The tower assembly according to claim 8, wherein:

the crossbar is about cylindrical; and the first lever is dished to conform to the cylindrical crossbar.

10. The tower assembly according to claim 2, wherein the top of the body includes linear teeth that protrude inwardly from the top of the body to engage the crossbar, thereby substantially fixing the crossbar relative to the tower assembly when the first lever is actuated to clamp the crossbar.

11. The tower assembly according to claim 10, wherein the first lever includes linear teeth that protrude outwardly from the first lever to engage the crossbar, thereby substantially fixing the crossbar relative to the tower assembly when the first lever is actuated to clamp the crossbar.

12. The tower assembly according to claim 10, wherein:

the crossbar is about cylindrical; and the first lever is dished to conform to the cylindrical crossbar.

13. A tower assembly for the installation of a crossbar on a vehicle comprising:

a tower body having a top for receiving a portion of the crossbar and a bottom for receiving a portion of the vehicle;

a first lever pivotally mounted to the body about a pivot axis so that the first lever can be rotated to clamp the crossbar between the first lever and the top of the body; and a first actuator for forcing the first lever against the crossbar;

a second lever pivotally mounted to the body about a pivot axis so that the second lever can be rotated to clamp the portion of the vehicle between the second lever and the bottom of the body, wherein the first lever and the second lever are pivotally mounted to the body about a common pivot axis; and a second actuator for forcing the second lever against the portion of the vehicle.

14. A tower assembly for the installation of a crossbar on a vehicle comprising:

a tower body having a top for receiving a portion of the crossbar and a bottom for receiving a portion of the vehicle;

a first lever pivotally mounted to the body about a pivot axis so that the first lever can be rotated to clamp the crossbar between the first lever and the top of the body; and a first actuator for forcing the first lever against the crossbar;

a second lever pivotally mounted to the body about a pivot axis so that the second lever can be rotated to clamp the portion of the vehicle between the second lever and the bottom of the body;

a second actuator for forcing the second lever against the portion of the vehicle; and a slider that slides between the first lever and the second lever to force the first lever away from the second lever; wherein the first actuator is a first portion of the slider and the second actuator is a second portion of the slider.

15. The tower assembly according to claim 14, wherein the slider includes a barrel nut threaded onto a bolt, and turning the bolt threads the bolt into the barrel nut, thereby forcing the barrel nut toward the pivot axis of the first lever.

16. The tower assembly according to claim 14, further comprising:

a threaded bolt operatively connected to the slider so that turning the bolt forces the slider to slide between the first lever and the second lever; and a handle retained on the bolt for manually turning the bolt.

17. The tower assembly according to claim 16, wherein:

the handle has a semispherical end that bears against the body; and the body has a semispherical receptacle conforming to the semispherical end of the handle.

18. A tower assembly for the installation of a crossbar on a vehicle comprising:

a tower body having a top for receiving a portion of the crossbar and a bottom for receiving a portion of the vehicle;

a first lever pivotally mounted to the body about a pivot axis so that the first lever can be rotated to clamp the crossbar between the first lever and the top of the body;

a first actuator for forcing the first lever against the crossbar; and a second lever pivotally mounted to the body about a pivot axis so that the second lever can be rotated to clamp the vehicle between the second lever and the bottom of the body, wherein the first actuator is operable to force the second lever against the vehicle.

19. A tower assembly for the installation of a crossbar on a vehicle comprising:

a body including a bottom for receiving a portion of the vehicle;

a first lever pivotally mounted to the body about a pivot axis and rotatably opposed to the bottom of the body so that the first lever can be rotated to clamp the vehicle between the first lever and the bottom of the body; and an actuator for forcing the first lever into operable contact with the vehicle, wherein the actuator is a slider that slides along the first lever to force the first lever toward the bottom of the body as the slider slides toward the pivot axis of the first lever.

20. The tower assembly according to claim 19, wherein the slider includes a barrel nut threaded onto a bolt, and turning the bolt threads the bolt into the barrel nut, thereby forcing the barrel nut toward the pivot axis of the first lever.

21. The tower assembly according to claim 19, further comprising a pad interposed the first lever and the bottom of the body to provide a nonmarring surface for when the first lever and the bottom of the body clamp the vehicle.

22. The tower assembly according to claim 19, wherein the first lever is an arcuate claw cupped toward the bottom of the body.

23. The tower assembly according to claim 19, further comprising:

a threaded bolt operatively connected to the slider so that turning the bolt forces the slider toward the pivot axis of the first lever; and a handle for manually turning the bolt.

24. The tower assembly according to claim 23, wherein:

the handle has a semispherical end that bears against the body; and the body has a semispherical receptacle conforming to the semispherical end of the handle.

* * * * *